(12) United States Patent
Hukelmann

(10) Patent No.: US 11,171,469 B2
(45) Date of Patent: Nov. 9, 2021

(54) HIGH-PRESSURE RESISTANT HOUSING WITH CONDUCTOR TO INNER VOLUME

(71) Applicant: DEUTSCHES INSTITUT FÜR LEBENSMITTELTECHNIK E.V, Quakenbrueck (DE)

(72) Inventor: Bernhard Hukelmann, Quakenbrueck (DE)

(73) Assignee: DEUTSCHES INSTITUT FÜR LEBENSMITTELTECHNIK E.V., Quakenbrueck (DE)

(*) Notice: Subject to any disclaimer, the term of this patent is extended or adjusted under 35 U.S.C. 154(b) by 18 days.

(21) Appl. No.: 16/564,749

(22) Filed: Sep. 9, 2019

(65) Prior Publication Data
US 2020/0350748 A1 Nov. 5, 2020

(30) Foreign Application Priority Data
Sep. 10, 2018 (EP) .................................. 18193566

(51) Int. Cl.
*G01D 11/30* (2006.01)
*H02G 3/04* (2006.01)
*F17C 13/00* (2006.01)

(52) U.S. Cl.
CPC ......... *H02G 3/0406* (2013.01); *H02G 3/0487* (2013.01)

(58) Field of Classification Search
CPC ........ B22C 9/04; B22D 25/026; B65D 25/00; G01D 11/30; G01F 23/242; H01B 17/30; H02G 3/0406; H02G 3/0487; H02G 3/04; H02G 3/088; H02G 3/22; F17C 13/00

USPC .......................... 174/68.1, 151, 65; 220/584
See application file for complete search history.

(56) References Cited

U.S. PATENT DOCUMENTS

| 3,158,682 | A | 11/1964 | Goellner |
| 5,544,782 | A | 8/1996 | Lindholm |
| 2002/0104673 | A1 | 8/2002 | Miller et al. |
| 2007/0033823 | A1* | 2/2007 | Steinich ............... G01B 3/11 33/756 |
| 2009/0200489 | A1* | 8/2009 | Tappel ............... H05K 5/069 250/492.3 |
| 2011/0132915 | A1 | 6/2011 | Stuhlbacher et al. |

(Continued)

FOREIGN PATENT DOCUMENTS

CN 204598134 U * 8/2015 ............. G03B 17/02

OTHER PUBLICATIONS

IntroToMatlab_Olofsson_pp. 1-10_Sep. 2014.*

*Primary Examiner* — Timothy J Thompson
*Assistant Examiner* — Guillermo J Egoavil
(74) *Attorney, Agent, or Firm* — Greer, Burns & Crain, Ltd.; Steven P. Fallon

(57) ABSTRACT

The invention relates to a housing having at least one current passage that is impervious to high pressure acting from the exterior, e.g. of at least 1000 bar, e.g. up to 8000 bar.
The housing has a first housing part and a second housing part that by spaced-apart bearing surfaces that are facing one another, between which at least one insulator is arranged, with the at least one insulator imperviously encompass an inner volume. The housing is opened easily by spacing apart the first housing part from the second one. Generally, the housing parts are electrically insulated from one another by the insulator.

20 Claims, 3 Drawing Sheets

(56) References Cited

U.S. PATENT DOCUMENTS

| | | | |
|---|---|---|---|
| 2013/0135832 A1* | 5/2013 | Stritzelberger | H02B 1/28 361/752 |
| 2014/0215785 A1* | 8/2014 | Weston | G01M 17/02 29/25.35 |
| 2018/0249252 A1* | 8/2018 | Clerici | H04R 7/10 |

* cited by examiner

HIGH-PRESSURE RESISTANT HOUSING WITH CONDUCTOR TO INNER VOLUME

This application claims the priority of the European patent application No. EP18193566.9, date of application 10 Sep. 2018.

The invention relates to a housing having at least one current passage that is impervious against high pressure acting from the exterior, e.g. of at least 1000 bar, e.g. up to 8000 bar. This housing, having at least one current passage that is resistant against high pressure acting from the exterior onto the housing, may be self-contained or may have a flange as one housing part, the inner volume of which is connected to e.g. an area of low pressure, e.g. arranged outside of a container and connected to the container that is arranged inside of a high-pressure environment, the inner volume of which is under the lower pressure, or may be arranged inside of a container, the inner volume of which is under high pressure, and be respectively connected to the wall of the container. The high-pressure resistant housing having a high-pressure resistant current passage may have an element, e.g. respectively outside and/or inside of the housing, that is electrically connected outside and/or inside of the housing, e.g. respectively at least one sensor and/or at least one actuator, and which element is electrically connected to the current passage. In the process, at least one electrical connector is formed by a conductor of the high-pressure resistant current passage and/or at least one electrical connector is formed by a part of the housing itself, if it consists of electrically conductive material, e.g. metal.

STATE OF THE ART

It is known to provide passage for electric lines in a pressure-resistant manner through drillings in housings through conduit glands. Such conduit glands may become leaky at higher pressures, e.g. the sealant may shoot out of the gland.

OBJECT OF THE INVENTION

The invention has the object of providing a high-pressure resistant housing with a high-pressure resistant current passage that is impervious preferably at pressures of at least 1000 bar, more preferably of at least 6000 bar.

DESCRIPTION OF THE INVENTION

The invention achieves the object by the features of the claims and in particular provides a housing having at least a first and a second housing part that have spaced-apart bearing surfaces facing one another, between which at least one insulator is arranged, and which housing parts with the at least one insulator imperviously encompass an inner volume. The housing is opened easily by spacing apart the first housing part from the second housing part. Preferably, at least a third housing part is arranged between the first and the second housing parts and at least one insulator each is arranged between the bearing surfaces, spaced apart and facing one another, of adjacent housing parts. Generally, at least one insulator is arranged between the bearing surfaces of adjacent housing parts so that the housing parts are electrically insulated from one another. In this embodiment, at least two of the housing parts, preferably all of the housing parts, are formed of electrically conductive material, preferably formed of metal, and may form electrical conductors, e.g. each having at least one electrical connector on the inner surface of the housing and each having at least one electrical connector on the outer surface of the housing.

The bearing surface generally extends e.g., over a cross-section of the wall of a housing part, in an angle of e.g. 30° to 90°, preferably perpendicularly, to the inner surface and/or to the outer surface of a housing part.

Generally, the invention relates to a housing resistant against high pressure acting from the exterior, the housing encompassing an inner volume, the housing having at least a first housing part and a second housing part, which are spaced apart and have matching and parallel bearing surfaces facing one another, between which at least one insulator is arranged on which the bearing surfaces rest or that is arranged between the bearing surfaces, wherein at least one electrical element is arranged outside of the housing and is electrically connected to a further electrical element inside of the inner volume of the housing. Preferably, the bearing surfaces are arranged in parallel planes. Preferably, the insulator is an insulated conductor having at least a conductor encased between two insulator layers, the conductor extending beyond the circumference of the first housing part and/or the second housing part to an outer terminal lug and the conductor having an inner terminal lug that extends beyond the first housing part and/or the second housing part, into the inner volume, wherein at least one terminal lug has a recess in at least one insulator layer, through which recess the conductor is accessible. Preferably, the conductor is circumferentially closed around the inner volume of the housing and only with its terminal lugs extends over the area of the bearing surfaces. Preferably, the insulated conductor has at least two spaced-apart conductors that have an outer terminal lug and an inner terminal lug each. Preferably, in the area between the bearing surfaces at least two spaced-apart conductors run in parallel to one another about a section of the inner volume. The at least one insulator optionally contains no conductor and at least one of the housing parts is electrically conductive and on the inner surface and/or on the outer surface has at least one electrical connector, wherein optionally the outer surface of at least one of the housing parts, preferably of both housing parts, is coated by a dielectric layer and is electrically insulated. Optionally, an electrical component is electrically connected to the inner terminal lugs of at least two insulated conductors and/or to the at least one inner terminal lug and one of the housing parts. Further optionally, at least one third housing part is arranged between the bearing surfaces of the first housing part and of the second housing part, the bearing surface of which third housing part is arranged in parallel and congruently to the bearing surfaces of the first and of the second housing parts, wherein at least one insulator is arranged adjacent to the bearing surfaces between each of the housing parts. The electrical component can be electrically connected to the outer terminal lugs of at least two insulated conductors and/or to the at least one outer terminal lug and to an electrically conductive one of the housing parts. Optionally, one of first and second housing parts is a flange, the inner volume of which is connected to an area of pressure lower than the high pressure. Generally, the housing parts in total may form a partial or complete spherical form. Optionally, an actuator is arranged inside the inner volume of the housing and is electrically connected to a sensor that is arranged outside of the housing, wherein the actuator is a transmitter and/or a receiver that is set up to generate or receive acoustical, optical, or electromagnetic signals. At least one of the conductors may be an electrical conductor or an optical conductor, wherein further optionally at least one of the housing parts consists of electrically non-conductive material.

Furthermore, the invention relates to a high-pressure container, and high pressure can be applied to its inner volume, wherein the high-pressure container contains a housing having a transmitter arranged within, wherein optionally the housing is not connected to the wall of the high-pressure container in a fluidproof manner and/or is not electrically connected to the wall of the high-pressure container and wherein a receiver is arranged outside of the high-pressure container that is set up to generate and/or receive acoustical, optical, or electromagnetic signals from the transmitter.

In the embodiment in which an insulator that optionally does not contain a conductor is arranged between the bearing surfaces of adjacent housing parts, the insulator insulates the adjacent housing parts from one another and the housing parts themselves form electric conductors that are electrically separated from one another by at least one insulator that is arranged in each interstice between the housing parts or between the bearing surfaces, respectively. In this embodiment, the housing parts themselves may be electrically conductive and may optionally have an electric connector on their inner surface and/or on their outer surface. Preferably, at least the housing parts forming a line, or all housing parts, on at least their outer surface and/or on their inner surface have arranged a dielectric coating that completely covers the outer surface and/or inner surface except for the electrical connectors, wherein preferably electrical conductors that preferably have a circumferential insulation directly adjacent to the dielectric coating are at least connected to the electrical connectors that are arranged on the outer surface of the housing parts. An electrical component, e.g. a transmitter and/or an actuator, may be electrically connected to the electrical conductors that are connected to the electrical connectors. Preferably, every housing part that has an electrical connector at least on its outer surface is provided with a complete dielectric coating and is therefore electrically insulated, wherein preferably the electrical connectors are occupied by insulated conductors that are electrically connected to an electrical component. Alternatively or additionally, an electrical line may be formed by a conducting layer between at least one insulator and one housing part, e.g. as a metal layer of uniform thickness between two insulators and/or as a metal layer between an insulator and a housing part. Therein, at least one of the housing parts or all housing parts may consist of electrically non-conductive material. Alternatively, at least one of the housing parts or all housing parts may consist of electrically conductive material, so that a line of a metal layer that is arranged directly between an insulator and a housing part is in electrical contact with the electrically conductive housing part. Preferably, a conducting layer with uniform thickness lies against an insulator over the complete bearing surface or an area equal to the complete bearing surface. Optionally, every line is arranged between two insulators.

The bearing surface of every housing part generally extends between its inner surface and its outer surface and is each circumferentially closed. Therefore, the opposite surfaces of an insulator arranged between two spaced-apart bearing surfaces of adjacent housing parts lie against the spaced-apart bearing surfaces in a circumferentially closed manner, wherein the bearing surfaces are pressed against the insulator by the static pressure acting onto the outer surface of the housing.

In one embodiment, the insulator is an insulated conductor that is arranged between the bearing surfaces of the housing parts and that has at least two insulator layers, between which a conductor, e.g, a flat strip conductor, is arranged. In this embodiment, the insulated conductor that is arranged between the bearing surfaces forms a current passage.

In its embodiment as an insulated conductor, the insulator has or consists of at least one conductor that is arranged between insulator layers, wherein the insulator layers completely encompass the conductor in the area arranged between the bearing surfaces. The bearing surfaces each rest on opposite surfaces of the insulated conductor, preferably the bearing surfaces rest all over the outer insulator layers of the insulated conductor, and accordingly also in the embodiment as insulator without a conductor.

Preferably, the first housing part has a bearing surface that is equally-sized and has a matching form with the bearing surface of the second housing part, e.g. a congruent form or the same form. Preferably, the bearing surfaces of adjacent housing parts, between which an insulated conductor is arranged, are arranged in a uniform distance from one another, preferably with a form that is congruent to one another, e.g. in form of parallel planes. Generally preferably, the insulator or the insulated conductor has a uniform thickness in the area arranged between the bearing surfaces. In the embodiment having at least one insulated conductor, the housing parts may independently consist of metal or a non-conductive material, e.g. synthetic material and/or ceramic.

A high-pressure impervious arrangement of the at least one insulator, that may be an insulated conductor, between bearing surfaces of housing parts is generated by the high pressure, which preferably is a static high pressure, acting onto the outer surfaces of the housing and pressing the bearing surfaces of the housing parts against one another onto the insulator or the insulated conductor lying in-between. Correspondingly, the housing optionally has no tensioning device that is adjusted to generate a force acting onto the bearing surfaces equal to a high pressure applied onto the outer surface of the housing. Optionally, the housing has a tensioning device that is adjusted to press the housing parts against one another and against the at least one insulator that may be an insulated conductor with a force that is sufficient only for a sealing arrangement under low pressure, e.g. up to 1 bar or up to 10 bar. This is because the arrangement of the housing parts at the at least one insulator that may be an insulated conductor at high pressure automatically seals the inner volume of the housing.

Generally preferably, the bearing surfaces arranged opposite to one another of adjacent housing parts are arched or sloped matchingly in parallel, preferably planar. Preferably, the bearing surfaces are continuous surfaces. The bearing surfaces in a cross-section may each be arched perpendicularly to the bearing surface, e.g. the one bearing surface may be convex and the matching one be concave, with the same profile or the same radius, respectively, or may be planar, preferably rotationally symmetrical toward a shared central axis, optionally sloped and preferably parallel to one another. Therein, the shared central axis may be a central axis of symmetry of the housing. Generally preferably, the bearing surfaces are planar and arranged in parallel planes that more preferably are perpendicular to a central axis of symmetry of the housing.

An advantage of the housing lies in that it is self-sealing at high pressure being applied onto the exterior. Due to the arrangement of the insulator, detachments from the insulator preferably cannot shoot freely into the inner volume of the housing, but rather e.g. parallel to the plane of the hearing surfaces onto the opposing wall.

Further preferably, the housing parts are symmetrical to a shared central axis of symmetry.

The insulator may be single-layered or multi-layered, particularly planiform. The insulator may have or consist of e.g. a synthetic material, preferably a polyimide layer (e.g. Kapton), and/or a ceramic, optionally coated unilaterally or bilaterally with an additional synthetic material, which is e.g. polytetrafluoroethylene (Teflon).

In the embodiment of the insulator as an insulated conductor, it preferably has an electrical connector in the form of an outer terminal lug that is electrically connected to the conductor, over which outer terminal lug the conductor extends beyond the outer surface of the housing, preferably encompassed by the insulator layers, wherein the outer terminal lug has a non-insulated section of the conductor or a line connected to the conductor (e.g. metals, preferably copper, or carbon), respectively. Preferably, the insulator layers that are arranged on both sides of an insulated conductor have or consist of synthetic materials, preferably a polyimide layer (e.g. Kapton), and/or a ceramic, optionally coated unilaterally or bilaterally with another synthetic material that may e.g, be polytetrafluoroethylene (Teflon).

Preferably, the insulated conductor has an electric connector in form of an inner terminal lug electrically connected to the conductor, which inner terminal lug extends beyond the inner surface of the housing into its inner volume and has a stripped conductor section or a line connected to a section of the conductor, especially to a terminal lug.

Preferably, the inner and the outer terminal lugs are arranged one opposite the other on a shared section of the conductor, e.g. along a perpendicular to an outer wall of the housing. For housing parts that are electrically conductive and form a line, an electrical connector, generally termed terminal lug, may be formed as a recess, e.g, as a thread bore, or as a projection that extends beyond the inner surface or the outer surface of the housing.

Optionally, the insulator, or in an embodiment the insulated conductor, may be flush with the outer surface of the housing except for at least one electrical connector, e.g. a terminal lug that extends beyond the outer surface of the housing. Optionally, the insulator, or in an embodiment the insulated conductor and therein the conductor, may extend beyond the outer surface of the housing. Alternatively, in the embodiment as insulated conductor, only its insulator layers may extend beyond the outer surface of the housing, so that the conductor is arranged only in the area of the bearing surfaces, preferably except for at least one outer and one inner terminal lug that extend beyond the housing.

In the embodiment as an insulated conductor, the outer and the inner terminal lugs, together with the conductor, form an electric line from the outer surface to the inner surface of the housing, respectively over the cross-section of the housing wall.

Optionally, the housing itself, if it is formed from an electrically conductive material, may also form a second line in the embodiment of the at least one insulator as an insulated conductor. Therein, at least one housing part may have an electrical connector as a terminal lug on its inner surface and/or on its outer surface, optionally only on its inner surface, wherein further optionally, an insulated conductor's terminal lug arranged inside the inner volume forms the other electrical connector inside the inner volume that is electrically connected to the outer volume, especially to the outer terminal lug.

Optionally, al least one of the housing parts (3a, 3b, 3c) may consist of electrically non-conductive material, e.g. of ceramic or synthetic material or of ceramic coated with synthetic material. In the embodiments of the insulator as an insulated conductor, or for an arrangement of at least two lines that are each formed of a metal layer and that are separated by at least one insulator arranged between them, all housing parts (3a, 3b, 3c) of the housing 3 may consist of an electrically non-conductive material. Lines that are each formed of one conductive layer, e.g. a metal layer, and that are separated by at least one insulator arranged between them, may be covered by insulators, e.g. on both their opposite surfaces that are parallel to the bearing surfaces. Therein it is preferred that at least one insulator each is arranged in-between lines that are formed of a metal layer, and between lines and bearing surfaces of housing parts.

The conductor arranged between insulator layers of an insulated conductor may be formed circumferentially closed, so that the conductor is circumferentially closed at least between the bearing surfaces, and especially between the outer surface and the inner surfaces, or that the conductor runs circumferentially around the inner volume of the housing, generally preferred with a constant cross-section of the conductor and constant cross-section of each insulator layer. This embodiment has the advantage that the cross-section of the insulated conductor except for terminal lugs is the same along the bearing surfaces, so that e.g. the insulated conductor is evenly loaded and possibly deformed under the high pressure acting from the exterior onto the housing.

Optionally, the conductor of an insulated conductor may extend along the total circumference of the insulated conductor, or run between the bearing surfaces along their total circumference. Therein, the conductor may optionally extend between the terminal lugs only over a section of the circumference of the insulated conductor, e.g. only linearly, e.g. perpendicularly to the outer wall and/or to the inner wall of the housing.

Optionally, in the embodiment of the insulator as an insulated conductor, at least two separated conductors may be arranged between two insulator layers, wherein the conductors do not contact one another and are each in contact with an inner and an outer terminal lug. Therein, the separated conductors may extend along the insulated conductor over a circumferential section, e.g. sectionally parallel or only in adjacent sections along the circumference of the insulated conductor, and may each be separated from the terminal lugs and from other conductors by a spacing.

Generally, the conductor may be deposited as a metal layer, e.g. sputtered or printed, on one of the insulator layers or on both insulator layers. The conductor and/or electrical connectors on it could e.g. be monolayers from carbon or very thinly plated conductive metals, e.g. having a layer thickness of 10 to 500 μm, e.g. 20 to 100 μm, wherein the layer thickness is determined prior to a pressure application onto the housing. Preferably, the device has one or more additional insulated conductors, the conductors of which each form an insulated electrical line from the outer surface to the inner surface of the housing. Preferably, the insulated conductors are identical in construction. The insulated conductors may be arranged e.g. staggered around the circumference of the bearing surfaces or overlapping one another. The insulated conductors may lie directly on top of one another between the hearing surfaces, or be spaced apart by a third housing part or by several third housing parts that are arranged between first and second housing parts. Generally, at least one third housing part may be arranged e.g. between the first and second housing parts, wherein preferably the bearing surfaces of all housing parts are arranged congruently, especially in parallel and congruently. Correspondingly, it is preferred that the bearing surfaces of the third housing part are arranged on its opposing ends and in parallel to one another. The at least one third housing part has a cross-section, e.g. adjacent to its bearing surfaces, that is equal to the cross-section of the first and/or of the second housing part in its bearing surface.

The housing is suitable for use in medium at high pressure, e.g. in medium at a high pressure of at least 2000 bar, preferably at least 2500 bar, at least 3000 bar, at least 3500 bar, at least 4000 bar, at least 4500 bar, at least 5000 bar, at least 5500 bar or at least 6000 bar, e.g. up to 8000 bar or up to 16000 bar, especially in steps of 100 bar each, because the high pressure of the medium presses the first and the second housing parts against one another, respectively onto opposite sides of the at least one insulator lying between them that may be at least one insulated conductor, and thereby the insulator forms a seal between the bearing surfaces that is stable and impervious against medium penetrating between the insulator and a bearing surface. Correspondingly, at least one third housing part is sealingly pressed with its bearing surfaces against the in-between insulators by the pressure between the first and the second housing part. Correspondingly, the housing is high-pressure resistant against a high pressure of at least 2000 bar, preferably at least 2500 bar, at least 3000 bar, at least 3500 bar, at least 4000 bar, at least 4500 bar, at least 5000 bar, at least 5500 bar or at least 6000 bar, e.g. up to 8000 bar or up to 16000 bar, especially in steps of 100 bar each. For a contact pressure of the bearing surfaces onto the in-between insulator, the cross-sectional area of the inner volume that is encompassed by the insulator is preferably larger, e.g. by a factor of at least 2, more preferably by a factor of at least 5, more preferably by a factor of at least 10 or at least 100, than the bearing surface, especially larger than the larger one of the encompassed bearing surfaces that are arranged against an insulator. Therein, it is discernible for a person of skill that the limitation lies in the maximum tolerable surface pressure of the sealing material (e.g. Kapton or ceramic) and therefore the bearing surfaces are large enough to not surpass the maximum surface pressure. Ultimately, the material must not flow away under the contact pressure. Additionally, preferably, the circumferential area of the at least one insulator that is exposed to the medium is smaller than the cross-sectional area of the inner volume that is encompassed by the insulator, e.g. by a factor of at least 0.01, of at least 0.5, of at least 2, of at least 5, of at least 10 or of at least 50 or of at least 100.

Preferably, the conductor material of an insulated conductor is made of metal, e.g. copper, or made of e.g. graphene and may be a strip conductor that is deposited on top of one of the insulator layers, while the other insulator layer is deposited on top of it, e.g. using an adhesive bond. The conducting layer may also be produced from doped crystals or a conductive doping in ceramic (e.g. 0.01 mm thick). Preferably, the insulator layers each have one thickness, preferably, the insulator layers that encompass a conductor between them have the same thickness. The strip conductor may be a data transmitting layer and may be an optical conductor that herein is not electrically connected but is optically coupled, e.g. an optical fiber. Therein, the energy for the operation of the external sensor or actuator may be transmitted e.g. also optically through an optical fiber.

Optionally, the conductor material may be arranged inside a recess of an insulator layer. Preferably, in this embodiment, the conductor material exactly fills the recess.

It has been shown that the bearing surface of the insulator, or the bearing surface on the insulator layers, respectively, is sufficiently large as to not surpass the tolerable surface pressure also in the embodiment as an insulated conductor. The surface pressure results from the maximum expected pressure acting onto the housing which is transferred through the bearing surfaces of the housing segments. The insulator, or the insulator layers in the embodiment as insulated conductor, may consist of e.g. synthetic material, preferably polyimide, e.g. available under the name Kapton from DuPont. It has shown that an insulator, or insulator layers of an insulated conductor, made from polyimide foil (Kapton), between which a conductor of a thickness of ca. 15 to 20 µm and width of ca. 12 mm made of copper, circumferentially closed, was arranged, formed a sealing of the housing (e.g. inner diameter d=32 mm, outer diameter d=64 µn) at high pressure of 2000 to 6000 bar (water as pressure medium). Generally, the housing may be arranged inside of a high-pressure container that is set up to have high pressure applied to its inner volume. Correspondingly, the invention also relates to the use of the high-pressure resistant housing inside of a high-pressure container.

Generally, it is preferred that the insulator layers rest directly on the bearing surfaces, i.e. no additional sealant, e.g. no adhesive, is arranged between the insulator layers and the bearing surfaces of the housing parts.

Independent from one another or same as the other, the housing parts may consist of metal, e.g. steel, or ceramic and/or glass. Preferably, each housing part is single-piece.

One housing part may optionally have a convex, e.g. arched, conical or polygonal outer surface or a planar outer surface, may optionally be spaced apart from the bearing surface, or may be e.g. plate-shaped. The inner surface of a housing part that borders on the bearing surface may form a recess, may be e.g. concavely arched, cylindrical or conical, or plate-shaped. Inside of the inner volume that is encompassed by the housing parts, as an electrical element e.g. a battery-powered actuator may be arranged and may be electrically connected to the at least one conductor, optionally contacted directly with the housing. The electrical element may be e.g. an electronical storage unit, a transmitter and/or receiver for acoustical, optical or electromagnetic radio signals, and/or may store sensor data, e.g. be connected to a data logger.

An electrical element that is connected to at least one conductor and is arranged outside or inside of the housing may be e.g. a transmitter or a receiver and/or an antenna for transmitting and/or receiving.

Preferably, as an electrical element, a housing has an additional externally connected sensor or actuator that is contacted with the electrical element arranged inside of the housing, which electrical element is e.g. a transmitter or receiver and/or a power source arranged inside of the housing. For instance, the additional sensor may be one for temperature, pressure, conductivity or another property of the medium surrounding the housing, wherein the sensor is arranged outside of the housing and is electrically connected to the transmitter or receiver arranged inside of the housing. A transmitter may be a sound generator, and a receiver may be a microphone. Therein optionally, the transmitter or receiver may each be arranged inside of their respective housing and may preferably be solidly connected to one housing part for sound transmission. In the embodiment of a transmitter being a sound generator arranged inside of the housing, or a receiver being a microphone arranged inside of the housing, sound waves are conducted through the housing parts and are emitted to the surrounding medium or absorbed from the surrounding medium as solid-borne sound of the housing (longitudinal wave and/or transversal wave through the housing). Transmitter and receiver may generally be connected to e.g. a control unit that is set up to generate or receive digital signals, a serial protocol and/or frequency modulated signals.

It has shown that transmitter and receiver may alternatively be set up for generating or receiving radio waves and may optionally be arranged only inside the inner volume of a housing with housing parts made of metal, while still being able to transmit radio waves. This is attributed to radio waves being able to pass through the area of an insulator that is arranged between two housing parts.

The housing has the advantage that, without a mechanical connection to a high-pressure container, it may be arranged inside of the high-pressure container and the housing is suitable to wirelessly send signals for readings taken by the sensor, wherein the readings may be transformed by a controlling unit of a transducer for a transmitter that forms an actuator, wherein the signals may be received outside of the high-pressure container.

Generally, at least two high-pressure resistant housings, one of which optionally as a housing part having a flange connected to a container, may form an arrangement that is set up to e.g. transmit data by one of the housings having a transmitter and another having a receiver. Such an arrangement may e.g. be arranged at a high-pressure container, wherein a high-pressure resistant housing that may extend into a high-pressure container as housing part has a flange that is connected to the inner surface of the container and the inner volume of the housing is in communication with the surrounding of the high-pressure container, and wherein another high-pressure resistant housing is arranged inside of the high-pressure container. Alternatively, an arrangement may have a housing, of which housing one housing part is a flange to the inner volume of a container that is arranged inside of a medium under higher pressure, or for which the inner volume of the container is under a pressure lower than the surroundings. Optionally, an arrangement may have a second housing that is circumferentially closed and is to be arranged inside the medium of higher pressure, wherein one of the housings contains a transmitter and the other one contains a receiver.

A housing may be arranged e.g. at a high-pressure container, wherein a high-pressure resistant housing, that may extend into a high-pressure container, as a housing part has a flange connected to the inner surface of the container wall and the inner volume of the housing is in communication with the surroundings of the high-pressure container.

The housing parts may be connected movably against one another, so that the housing parts are movable towards one another and are pressed onto the insulated conductor under high pressure acting from the exterior onto the housing. An installation that connects the housing parts while keeping them movable towards one another may e.g. be a bayonet joint that is arranged at the outer surface or at the inner surface of the housing parts, or a guide that engages on the outer surface and/or inner surface of the housing parts and that is arranged e.g. at an angle of 30° to 90° to a bearing surface, and/or a spring that strains the housing parts towards one another.

A sensor that is arranged outside of the housing and that is electrically connected to the housing and/or to the insulated conductors may be e.g. a temperature sensor, a conductivity sensor, a pressure sensor, a pH sensor, a radiation sensor, and/or an actuator, e.g. an antenna.

BRIEF DESCRIPTION OF THE FIGURES

The invention will now be described more precisely with reference to the figures that schematically show in FIG. 1 a cross-sectional view of an embodiment of the device, FIG. 2 an exploded assembly drawing of further embodiments of the device, FIG. 3 a cross-sectional view of a further embodiment of the device in a high-pressure boiler, FIG. 4 a cross-sectional view of a further embodiment of the device, FIG. 5 a top view onto an insulated conductor, FIG. 6 an exploded assembly drawing of an insulated conductor, and FIG. 7 a cross-sectional view of a further embodiment of the device.

FIG. 1 shows an embodiment in which a housing 3 is formed of a first housing part 3a and of a second housing part 3b and wherein all housing parts 3a, 3b have bearing surfaces 4 that are congruent and parallel to one another and that have an insulator 5a arranged between them. The bearing surfaces 4 are arranged perpendicularly to the longitudinal axis of the housing 3 and are, as preferred, planar. The outer surfaces of all housing parts 3a, 3b may, as preferred, be covered by a layer of dielectric material 6 and therefore be electrically insulated against one another and possibly against a surrounding medium. Between the spaced-apart bearing surfaces 4 of the housing parts 3a, 3b, the uniformly thick insulator 5a is arranged that extends over the complete bearing surface 4 of every housing part 3a, 3b. Additionally, as preferred, a line 8 that extends over the complete bearing surface 4 of every housing part 3a, 3b is each arranged between insulator 5a and the bearing surface 4 of one of the housing parts 3a, 3b. Optionally, the line 8 may be covered by a dielectrical material. The insulator 5a spaces the housing parts 3a, 3b from one another, so that these are also electrically separated. The lines 8 are arranged immediately adjacent to one of the housing parts 3a, 3b with their side that is opposite of the insulator 5a. In the embodiment of the housing parts 3a, 3b made of electrically conductive material, the housing parts 3a, 3b are in electrical contact with the lines 8. In the embodiment of electrical lines 8 as a conductive layer between at least one insulator 5a and a housing part 3a, 3b, at least one of the housing parts 3a, 3b or all housing parts 3a, 3b, 3c may consist of electrically non-conductive material. Optionally (not shown), an additional insulator 5a may be arranged between each line 8 and the adjacent housing part 3a, 3b, so that every line 8 is covered on both opposing sides by insulators 5a.

Figure 1:
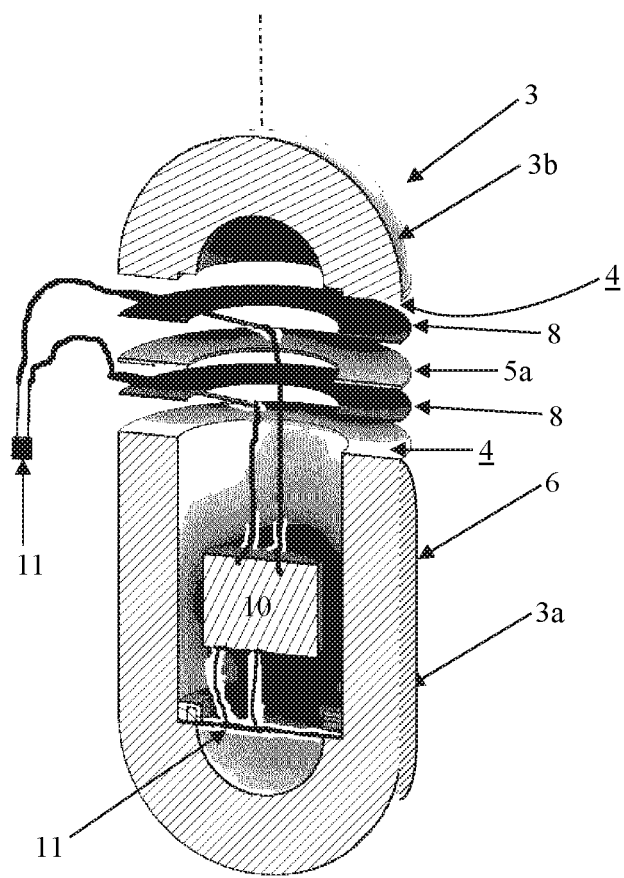

Outside of the housing 3, an electrical element 11, e.g. a sensor, especially a temperature sensor, is connected to the lines 8 via separated insulated lines 8. Inside of the inner volume of the housing 3, as another electrical element 11, a piezoelectric speaker is connected as transmitter to the lines 8 via a transducer 10. The transducer 10 converts the measurement signals of the sensor 11 into electrical control signals for the transmitter. In a simple variant, the transducer 10 is set up to apply a current of a 33 kHz frequency to the transmitter at a measurement signal equaling 0° C. from the sensor 11, and to apply a current of a 60 kHz frequency to the transmitter at a measurement signal equaling 65° C. The piezoelectric speaker was glued onto the inner surface of the first housing part 3a. The housing 3 was put into a high-pressure container of the company Hyperbaric, Spain, which was filled with water and high pressure of 6000 bar, which acted onto the housing 3, was applied by means of a pump. A piezoelectric microphone glued to the outside of the high-pressure container was able to record the different frequencies.

Alternatively, housing parts 3a, 3b consisting of electrically conductive material may form electrical lines, because they are electrically separated from one another by the insulator 5a, and an electrical element may be electrically connected to further separated housing parts 3a, 3b. In this embodiment, an electrical element inside of the inner volume of the housing 3 may be connected to the housing parts 3a, 3b.

Figure 2:
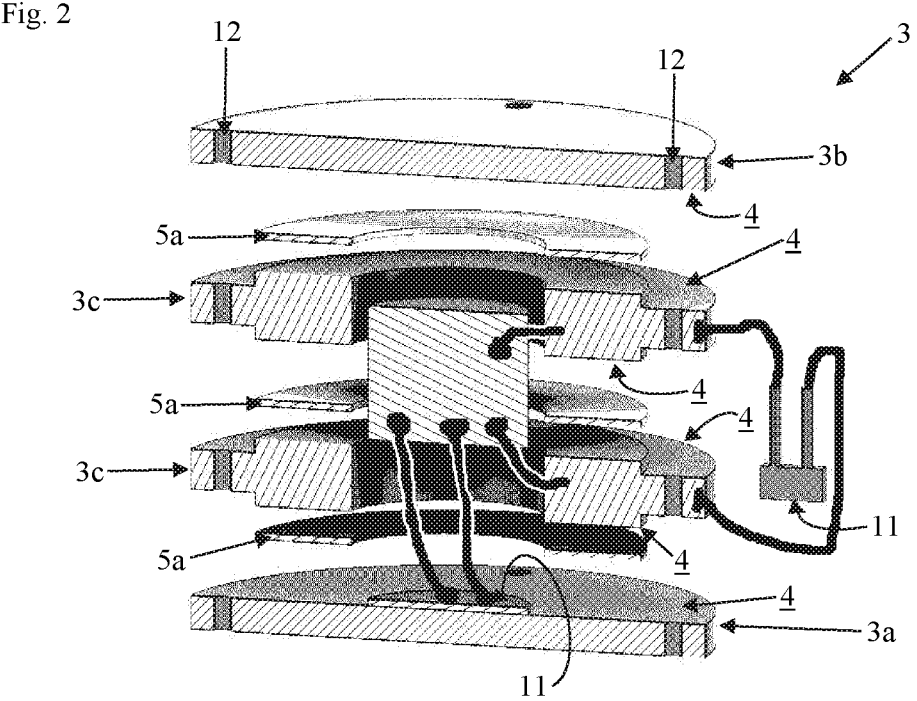

FIG. 2 shows an exploded assembly drawing of an embodiment wherein the first and the second housing parts 3a, 3b are plate-shaped. The bearing surfaces 4 of the housing parts 3a, 3b are parallel to one another and are electrically separated by insulators 5a that are arranged between the housing parts 3a, 3b. Between the first and the second housing pail 3a, 3b, third housing parts 3c are arranged that are each spaced apart and electrically separated from one another and from the first and second housing parts 3a, 3b by interjacent insulators 5a. The third housing parts 3c have bearing surfaces 4 that are parallel to the bearing surfaces 4 of the first and second housing parts 3a, 3b and to the insulators 5a. The third housing parts 3c consist of electrically conductive material and form electric lines 8. Preferably, the outer surfaces of all housing parts 3a, 3b, 3c are insulated by a dielectric coating, so that an electrical element 11 may be electrically connected to separated housing parts 3a, 3b, 3c. The embodiment of FIG. 2 shows bores 12 that may serve as guides for a tensioning device, by which the first and the second housing parts 3a, 3b may be loaded against one another, in order to allow for a fluidproof arrangement of the housing parts 3a, 3b, 3c against the interjacent insulators 5a. For this purpose, e.g. a contact pressure in the amount of the weight force of the construction part onto the bearing surfaces 4 may suffice. Upon application of high pressure acting from the exterior onto the housing 3, the contact pressure onto the bearing surfaces 4 is generated by the pressure acting perpendicularly to the bearing surfaces onto the housing parts 3a, 3b, 3c.

Figure 3:
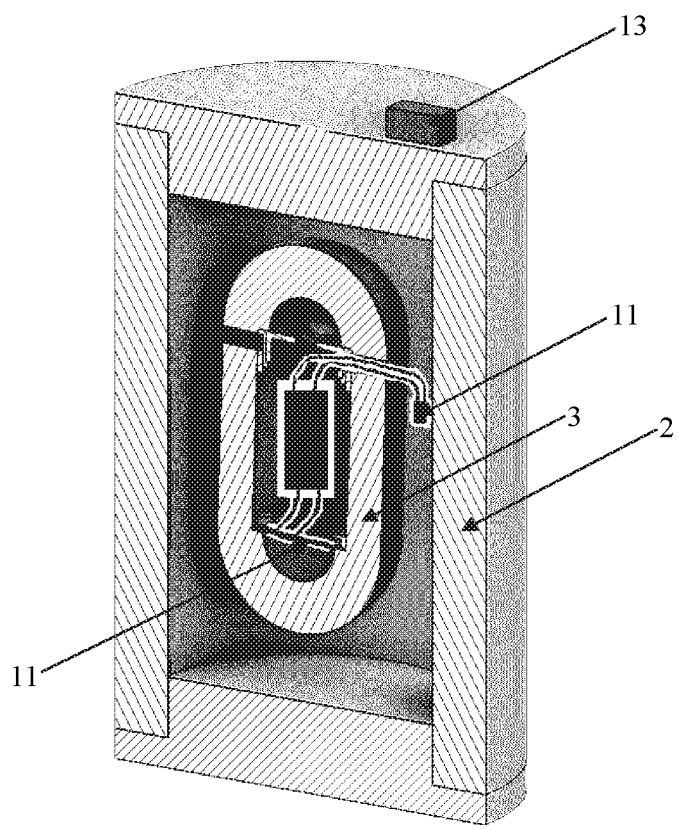

FIG. 3 shows a housing 3 according to FIG. 1 inside of a medium 1 that is under high pressure, e.g. inside of a high-pressure boiler 2. To the outer wall of the high-pressure boiler 2, a receiver 13 is attached that is set up to record vibrations generated by a transmitter as an electrical element 11, which is arranged inside of the high-pressure resistant housing 3.

Figure 4:
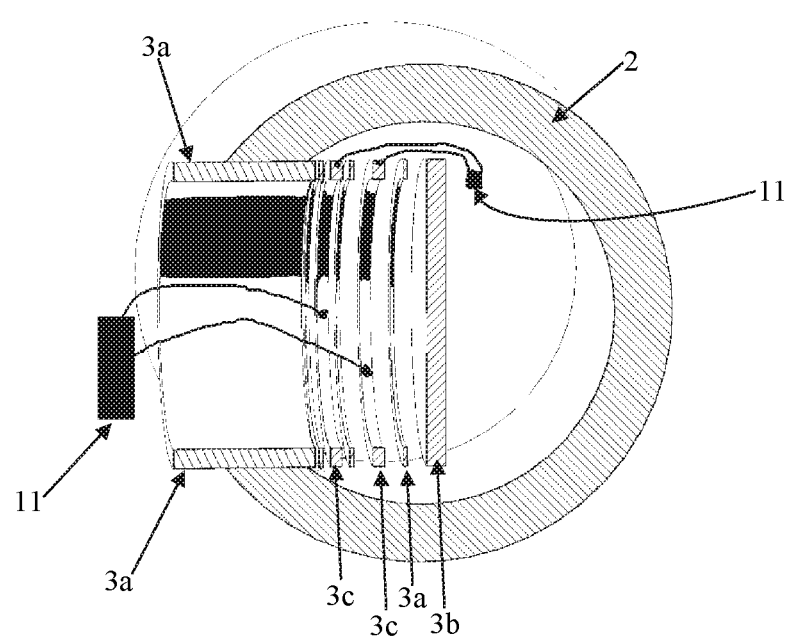

FIG. 4 shows an embodiment wherein a first housing part 3a is formed as a flange, the inner volume of which is connected to an area of low pressure, e.g. standard or ambient pressure, wherein the outer surface of the housing 3 is subjected to high pressure. Therein, the housing 3 may e.g. be arranged within a high-pressure boiler 2. The second housing part 3b may be plate-shaped. The additional housing parts 3c that are arranged between the first housing part 3a and the second housing part 3b may e.g. be ring-shaped, wherein insulators 5a are arranged between each of the housing parts 3a, 3b, 3c, as is also described with reference to FIG. 2. Therein, the housing 3 may have a first housing part 3a and a second housing part 3b, as well as at least one third housing part 3c between them. The housing parts 3a, 3b, 3c each have bearing surfaces 4 that face one another, and insulated conductors 5 are arranged between the bearing surfaces 4 of adjacent housing parts 3a, 3b, 3c. The housing parts 3a, 3b, 3c, together with the insulated conductors 5, encompass an inner volume that is connected to an area of lower pressure via the first housing part 3a that is formed as a flange. Outside of the housing 3, preferably by insulated lines, an electrical element 11, e.g. a sensor or an actuator, is connected to the lines 8 that are formed by the third housing parts 3c.

Figure 5:
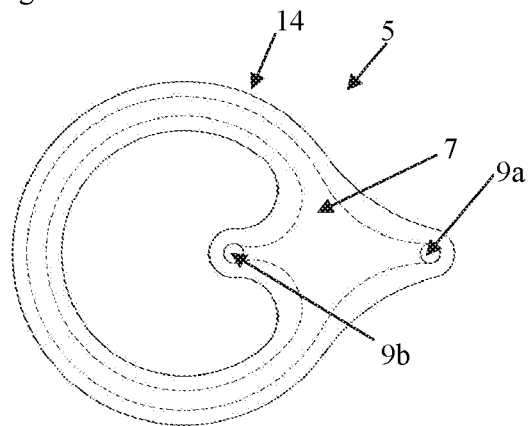

FIG. 5 shows an insulated conductor 5, in which a conductor 7 (dashed line e.g. a copper layer, is arranged between two insulator layers 14. Both insulator layers 14, preferably consisting of foil, e.g. of polyimide, fully cover the conductor 7 on both sides, except for one outer terminal lug 9a and one inner terminal lug 9b, so that the terminal lugs 9a, 9b each have a recess in at least one of the insulator layers 14 in order to provide a connecting point for a line connected thereto, especially for an insulated line like a cable, especially in the form of a soldering pad. The here-depicted form of an insulated conductor 5 is suited for arrangement between ring-shaped bearing surfaces 4.

The conductor 7 is circumferentially closed and has an essentially uniform thickness, so that the insulated conductor 5 has a uniform thickness with the insulator layers 14 that each have an insulator foil or may consist thereof. Optionally, both of the insulator layers 14 or insulator foils may be firmly bonded, e.g. glued, to one another and/or to the conductor 7, optionally by an additional adhesive. The conductor 7 may e.g. have a thickness in the range of 5 to 20 μm of a metal, preferably copper, a preferred insulator foil is polyimide, e.g. Kapton.

Figure 6:
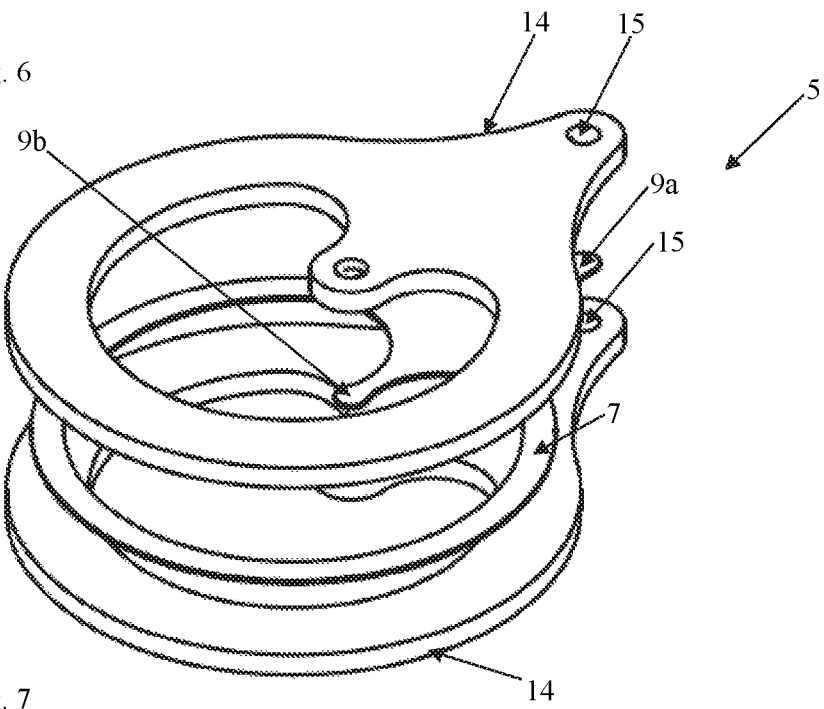

FIG. 6 shows the assembly of the insulated conductor 5 in a perspectival exploded assembly drawing. The conductor 7 is again circumferentially closed arranged between insulator layers 14 and has terminal lugs 9a, 9b that are accessible as soldering pad only via recesses 15 in an insulator layer 14.

Figure 7:
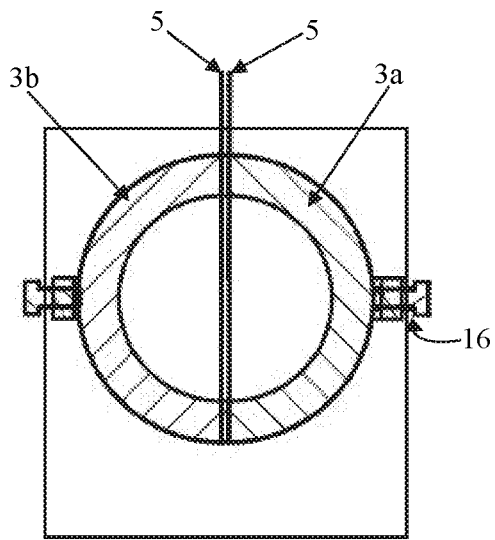

FIG. 7 shows a spherical first housing part 3a and a spherical second housing part 3b, the bearing surfaces 4 of which are oriented against one another and between which two insulated conductors 5 are arranged. The insulated conductors 5 may rest directly on top of one another, as shown here, or may be spaced apart by a third housing part 3c. The housing parts 3a, 3b, 3c have ring-shaped bearing surfaces 4 that are each planar and parallel to one another.

For an arrangement of the housing parts 3a, 3b, 3c against one another, so that they are pressed against one another and between their bearing surfaces 4 imperviously squeeze the insulated conductors 5 even without the effect of high pressure acting onto the outer surface of the housing 3, a tensioning device 16 is shown that is guided by a frame and, as generally preferred, is arranged to load the first housing part 3a against the second housing part 3b or against the third housing part 3c, each perpendicularly to their bearing surfaces 4, wherein the housing parts 3a, 3b, 3c are still movable towards one another. Such a tensioning device serves to align the housing parts 3a, 3b, 3c, and the insulated conductors 5 between them, towards one another and hold them even in the absence of high pressure, so that the bearing surfaces 4 are arranged against one another, preferably congruently, with a spacing and parallel to one another, wherein at least one insulated conductor 5 is arranged within the spacing.

The invention claimed is:

1. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator is an insulated conductor that has at least one conductor encompassed between two insulator layers, wherein the insulated conductor has terminal lugs that extend beyond the circumference of the first housing part, and wherein the insulated conductor is circumferentially closed around the inner volume.

2. The housing according to claim 1, wherein the bearing surfaces are arranged in parallel planes.

3. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator is an insulated conductor that has at least one conductor encompassed between two insulator layers, wherein the insulated conductor has at least two spaced-apart conductors, wherein each of the at least two spaced-apart conductors comprises an outer terminal lug and one inner terminal lug that each extend beyond the circumference of the first housing part.

4. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator is an insulated conductor that has at least one conductor encompassed between two insulator layers, wherein the insulated conductor has at least two spaced-apart conductors, wherein each of the at least two spaced-apart conductors comprises an outer terminal lug and one inner terminal lug, that each extend beyond the circumference of the first housing part, and wherein the at least two spaced-apart conductors in the area between the bearing surfaces run in parallel to one another about a section of the inner volume.

5. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator comprises at least two separated conductors each arranged between two insulator layers, wherein each of the at least two separated conductors comprises an inner terminal lug and an outer terminal lug that each extend beyond the circumference of the first housing part, wherein an electrical component is electrically connected to the inner terminal lugs of the at least two separated conductors and/or to one inner terminal lug of one of the two at least two separated conductors and one of the first and second housing parts.

6. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator is an insulated conductor that has at least one conductor encompassed between two insulator layers, and that extends beyond the circumference of the first housing part, wherein at least a third housing part is arranged between the bearing surfaces of the first housing part and of the second housing part, the opposite bearing surfaces of which are arranged in parallel and congruently to the bearing surfaces of the first and of the second housing parts, wherein at least one insulator is arranged adjacent to the bearing surfaces between each of the housing parts.

7. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator comprises at least two separated conductors each arranged between two insulator layers, wherein each of the at least two separated conductors comprises an inner terminal lug and an outer terminal lug that each extend beyond the circumference of the first housing part, wherein an electrical component is electrically connected to the outer terminal lugs of the at least two separated conductors and/or to one outer terminal lug of one of the two at least two separated conductors and an electrically conductive one of the housing parts.

8. A high-pressure resistant housing encompassing an inner volume having at least a first housing part and a second housing part that are spaced apart and have parallel bearing surfaces matching one another and facing one another, between which at least one insulator is arranged, on which the bearing surfaces rest, wherein at least one electrical element is arranged outside of the housing and is electrically connected to an additional electrical element inside the inner volume of the housing, wherein the insulator is an insulated conductor that has at least one conductor encompassed between two insulator layers and that extends beyond the circumference of the first housing part, wherein one of the first and second housing parts is a flange, the inner volume of which is connected to an area of pressure lower than the high pressure.

9. The housing according to claim 1, wherein the housing parts as a whole form a partial or complete spherical form.

10. The housing according to claim 1, wherein an actuator is arranged inside of the inner volume of the housing and is electrically connected to a sensor arranged outside of the housing, wherein the actuator is a transmitter and/or a receiver that is set up to generate or receive acoustical, optical, or electromagnetic signals.

11. The housing according to claim 1, wherein at least one of the conductors is an electrical conductor or an optical conductor, and wherein at least one of the housing parts consists of electrically non-conductive material.

12. The housing according to claim 1, wherein the bearing surfaces are parallel to one another over a segment of the inner volume.

13. A high-pressure container that contains a housing according to claim 1, wherein the housing is not fluidproof and/or is not electrically connected to the wall of the high-pressure container, and wherein a receiver for acoustical, optical, or electromagnetic signals is arranged outside of the high-pressure container.

14. A high-pressure resistant housing encompassing an inner volume having at least a first housing part and a second housing part that are spaced apart and have parallel bearing surfaces matching one another and facing one another, between which at least one insulator is arranged on which the bearing surfaces rest, wherein at least one electrical element is arranged outside of the housing and is electrically connected to an additional electrical element inside the inner volume of the housing, wherein the at least one insulator does not contain a conductor and wherein at least one of the housing parts is electrically conductive and has at least one electrical connector on its inner surface and/or on its outer surface.

15. The housing according to claim 14, wherein the outer surface of at least one of the housing parts is coated by a dielectric layer and is electrically insulated.

16. The housing according to claim 14, wherein at least one third housing part is arranged between the bearing surfaces of the first housing part and of the second housing part, the opposite bearing surfaces of which are arranged in parallel and congruently to the bearing surfaces of the first and of the second housing parts, wherein at least one insulator is arranged adjacent to the bearing surfaces between each of the housing parts.

17. The housing according to claim 14, wherein an actuator is arranged inside of the inner volume of the housing and is connected to a sensor that is arranged outside of the housing, wherein the actuator is a transmitter and/or receiver that is set up to generate or receive acoustical, optical, or electromagnetic signals.

18. A high-pressure container that contains a housing according to claim 17, wherein the housing is not fluidproof and/or is not electrically connected to the wall of the high-pressure container, and wherein a receiver for acoustical, optical, or electromagnetic signals is arranged outside of the high-pressure container.

19. A high-pressure container that contains a housing according to claim 1, wherein the at least one conductor extends beyond the second housing part to an outer terminal lug.

20. A high-pressure container that contains a housing according to claim 19, comprising an inner terminal lug that extends beyond at least one of the first housing part and the second housing part into the inner volume, wherein at least one of the outer terminal lug and the inner terminal lug has a recess in at least one insulator layer, through which the conductor is accessible.

* * * * *